United States Patent Office 2,881,529
Patented Apr. 14, 1959

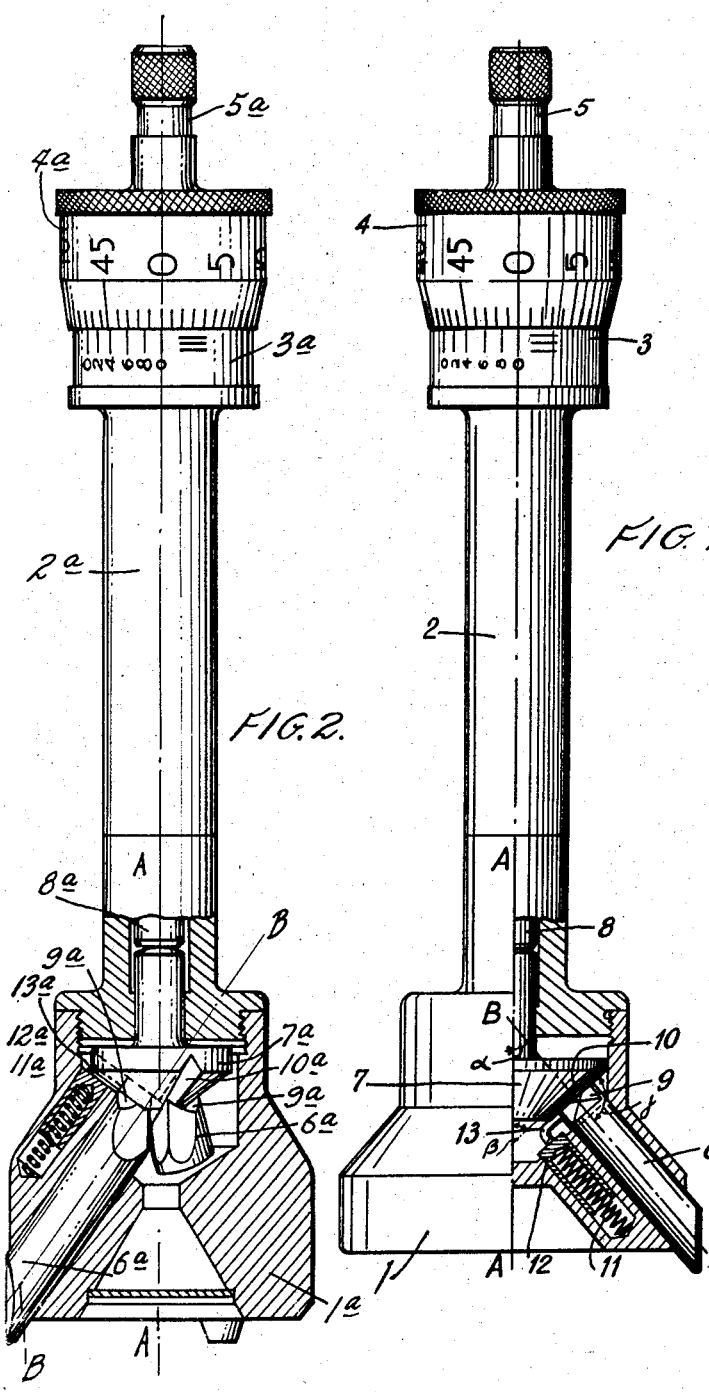

2,881,529

INTERNAL DIAMETER MICROMETER

Pierre Marcel Roch, Rolle, Switzerland, assignor to Pierre Roch S.a.r.l., Rolle, Switzerland, a Swiss company Application December 13, 1954, Serial No. 474,920

Claims priority, application Switzerland September 17, 1954

3 Claims. (Cl. 33—178)

The object of the present invention is to provide an instrument for measuring the internal diameter of blind borings and holes, which comprises a measuring head having cylindrical feelers slidable therein and arranged obliquely in relation to the axis of the head in equally spaced radial planes, with the inner ends of the feelers co-operating with a conical part actuated axially within the head by a micrometric screw.

Instruments of this kind are already known, in which the feelers are cylindrical and are pushed generally radially outward by a conical part in order to come into contact with the walls of the blind borings or holes. Such instruments have the disadvantage that the contact of the feelers with the conical part occurs only along a line which is a generatrix of the latter so that rapid wear appears followed by a loss in precision. On the other hand, the means for preventing rotation of the feelers are fragile, so that loss of precision also occurs as a result of wear.

Instruments of the type mentioned above are also known in which cylindrical feelers inclined with respect to the axis of the instrument are arranged in the shape of a star and engaged by a flat part which, when moved axially by means of a micrometric measuring screw, pushes the feelers so that their outer ends come into contact with the walls of the boring which have to be measured. Some constructional difficulties are also inherent in these instruments in preventing rotation of the feelers. Such instruments have the further disadvantage that the inclination of the feelers relative to the plane of the flat part engaged thereby is considerable and that there is a considerable overhang of the feelers in the interval of their measuring capacity, leading to difficulties in the construction and to longitudinal encumbrance.

The present invention aims at avoiding these disadvantages and the instruments embodying the invention characterized by the fact that the inner end of each feeler has at least two plane surfaces cooperating with corresponding guiding surfaces on the conical part in order to prevent the feeler and the conical part from rotating about their respective axes.

The above, and other objects, features and advantages of the invention, will be apparent in the following detailed description of illustrative embodiments thereof which is to be read in connection with the accompanying drawings forming a part hereof, and wherein:

Fig. 1 is an enlarged elevational view of an instrument embodying the invention, shown partly broken away and in section and indicating one type of feeler guiding means; and Fig. 2 is a view similar to that of Fig. 1, but illustrating a preferred embodiment of the invention in which a modified form of feeler guiding means is employed.

The instrument shown in Fig. 1 comprises a measuring head generally indicated at 1, a stop body 2 and a micrometric stop 3 cooperating to define an elongated housing provided with a graduated drum 4 and a friction device 5.

The measuring head 1 has three feelers 6 slidably mounted therein (of which only one is shown in the drawing) and arranged in the shape of a star in equally spaced radial planes, with the axis B—B of each feeler 6 being inclined in relation to the axis A—A of the head 1. The inner ends of the feelers cooperate with a conical part 7 having a cylindrical stem 7' received in an axial bore of the head 1 for axial movement in the latter by a micrometric screw of which only the end 8 is visible.

The inner end of each feeler 6 in Fig. 1 is provided with two parallel plane surfaces 9, slidably engageable with corresponding plane guiding surfaces forming the opposite sides of a groove 10 having a U-shaped cross-section and extending along a generatrix of the surface of the conical part 7. Owing to this arrangement, the feeler can slide in the direction of its axis B—B relative to the head, without rotating about its axis, and the conical part 7 can move along its axis A—A while being prevented from rotating about the last mentioned axis.

Instead of being parallel, the plane surfaces at the inner end of each feeler could converge and meet to form an edge, while the corresponding groove of the conical part would then have a V-shaped cross-section.

Thus, referring to Fig. 2 of the drawings, wherein the various parts of the illustrated instrument are identified by the same reference numerals as have been employed above in referring to the corresponding parts of the instrument of Fig. 1, but with the letter "a" appended thereto, it will be seen that, in the preferred embodiment of Fig. 2, the inner end of each feeler 6a has plane surfaces 9a which converge and meet to form an edge, while the corresponding groove 10a in the surface of conical part 7a is of V-shaped cross-section to provide planar, sliding engagement between the converging plane surfaces 9a of the feeler and the converging, planar side wall surfaces of the related groove 10a.

Each feeler 6 or 6a is elastically maintained in contact against the conical part 7 or 7a with the help of a helical spring 11 or 11a which is parallel to the axis B—B of the feeler. In order to obtain this, a piston 12 or 12a mounted to slide in a boring formed in the measuring head 1 or 1a, is acted upon by the spring 11 or 11a and exerts a thrust on a projection 13, 13a carried by the feeler 6 or 6a. By turning the micrometric drum 4 in one direction, an axial displacement of the conical part 7 is obtained, for instance towards the extremity of the measuring head 1, the feelers being thus thrust towards the exterior of the measuring head, both axially and radially. By turning the micrometric drum in the other direction, the feelers are automatically retracted into the head by the action of the springs 11 or 11a.

The angle $\alpha$ formed by the axis B—B of the feelers with the axis A—A of the measuring head and the angle $\beta$ of the bottom of the groove 10a with this axis A—A, are selected to comply with the following relation:

$$\text{Cotangent } \alpha + \text{cotangent } \beta = 2$$

Thus, assuming a particular axial displacement of the conical part 7, the outer end of each feeler moves radially a distance equal to one-half said axial displacement.

It is desirable to make the angle $\beta$ larger than 45°, for instance from 45° to 90°, while the angle $\alpha$ determined by the above relation is smaller than 45°.

Selecting $\beta=60°$, one obtains $\alpha=35°6'14''$, and the angle $\gamma$ formed by the axis of each feeler with the cooperating surface of the conical part is 84°53'46'', so that for a given displacement of the conical part the extremity of each feeler moves radially a distance equal to one half that axial displacement.

For the limiting case where $\beta=90°$, one obtains $\alpha=26°33'54''$.

What I claim is:

1. An inside diameter measuring device comprising an elongated housing having a hollow measuring head at one end, a conical part in said head having a cylindrical stem slidably received by said head to permit rotation and axial displacement of said conical part relative to said head, a micrometric screw threadably received in said housing and bearing axially against said stem for effecting axial displacement of said conical part, a plurality of cylindrical feelers slidably mounted in said head so that each feeler is displaceable along its own axis with respect to said head, said feelers being arranged with their longitudinal axes lying in equally spaced apart planes radiating from the axis of said conical part and each enclosing an acute angle with said axis of the conical part, each of said feelers having two planar surfaces at the inner end thereof converging to meet and form an edge, said conical part having a groove of V-shaped cross-section corresponding to the planar surfaces and extending along a generatrix of said conical part for each of said feelers and being engaged by said converging planar surfaces of the related feeler, thereby to prevent rotation of said conical part about said axis of the latter and also to prevent rotation of said feelers about said longitudinal axes of the latter, and spring means urging said feelers longitudinally in the direction against said conical part so that said feelers are displaced longitudinally in response to axial displacement of the conical part by said micrometric screw.

2. An inside diameter measuring device as in claim 1, wherein said acute angle enclosed by said longitudinal axis of each feeler and by said axis of the conical part is less than 45 degrees.

3. An inside diameter measuring device as in claim 1, wherein said acute angle enclosed by said longitudinal axis of each feeler and by said axis of the conical part is 35 degrees, 6 minutes and 14 seconds, each generatrix of said conical part and said axis of the latter enclose an angle of 60 degrees, and the longitudinal axis of each feeler and the generatrix of the conical part at the related groove in the later enclose an angle of 84 degrees, 53 minutes and 46 seconds, so that, in response to axial displacement of said conical part, the outer end of each feeler moves radially a distance equal to one-half said axial displacement of the conical part.

References Cited in the file of this patent

UNITED STATES PATENTS

| | | |
|---|---|---|
| 1,547,668 | Poltin | July 28, 1925 |
| 2,135,912 | Rae | Nov. 8, 1938 |
| 2,478,427 | Schmid | Aug. 9, 1949 |
| 2,577,633 | Schaetzle | Dec. 4, 1951 |
| 2,584,602 | McKee | Feb. 5, 1952 |
| 2,591,452 | Maag | Apr. 1, 1952 |
| 2,674,046 | Kaye | Apr. 6, 1954 |
| 2,679,107 | Gondek | May 25, 1954 |

FOREIGN PATENTS

| | | |
|---|---|---|
| 245,407 | Switzerland | July 1, 1947 |
| 261,069 | Switzerland | Aug. 1, 1949 |